(12) United States Patent
Manzoni et al.

(10) Patent No.: US 11,881,609 B2
(45) Date of Patent: Jan. 23, 2024

(54) RADIO FREQUENCY FILTER COMPRISING A SCREW MOUNTED RESONATOR, WHERE THE SCREW INCLUDES RECESSES ON THE PERIMETER THEREOF

(71) Applicant: CommScope Italy S.R.L., Lombardy (IT)

(72) Inventors: Andrea Manzoni, Missaglia (IT); Luca Bonato, Lazatte (IT); Antonio Sala, Agrate Brianza (IT)

(73) Assignee: CommScope Italy S.R.L., Milan (IT)

( * ) Notice: Subject to any disclaimer, the term of this patent is extended or adjusted under 35 U.S.C. 154(b) by 0 days.

(21) Appl. No.: 17/722,753

(22) Filed: Apr. 18, 2022

(65) Prior Publication Data

US 2022/0384927 A1    Dec. 1, 2022

(30) Foreign Application Priority Data

May 19, 2021    (IT) .................. 102021000012983

(51) Int. Cl.
| | |
|---|---|
| H01P 1/205 | (2006.01) |
| H01P 1/207 | (2006.01) |
| H01P 3/12 | (2006.01) |
| H01P 7/04 | (2006.01) |
| H01P 7/10 | (2006.01) |
| H01P 7/06 | (2006.01) |
| H01P 11/00 | (2006.01) |

(52) U.S. Cl.
CPC ............ *H01P 1/2053* (2013.01); *H01P 1/207* (2013.01); *H01P 3/12* (2013.01); *H01P 7/04* (2013.01); *H01P 7/06* (2013.01); *H01P 7/10* (2013.01); *H01P 11/007* (2013.01); *H01P 11/008* (2013.01)

(58) Field of Classification Search
CPC ...... H01P 1/205; H01P 1/2053; H01P 11/007; H01P 7/04; H01P 11/008
USPC .................................................. 333/203, 222
See application file for complete search history.

(56) References Cited

U.S. PATENT DOCUMENTS

| | | | | |
|---|---|---|---|---|
| 4,380,747 A | * | 4/1983 | Curtinot et al. .......... | H01P 7/04 333/202 |
| 9,887,442 B2 | * | 2/2018 | Lim et al. ............. | H01P 1/2053 |
| 2001/0000657 A1 | * | 5/2001 | Hershtig ............... | H01P 1/2084 333/202 |
| 2015/0207194 A1 | * | 7/2015 | Chong et al. ......... | H01P 1/2053 333/211 |

FOREIGN PATENT DOCUMENTS

| | | |
|---|---|---|
| CN | 103094649 A | 5/2013 |
| CN | 104269592 A | 1/2015 |
| CN | 212571284 U | 2/2021 |
| EP | 2058898 A1 | 5/2009 |

OTHER PUBLICATIONS

"Office Action with Search Report", IT Application No. 102021000012983, dated Feb. 3, 2022, 11 pp.

* cited by examiner

*Primary Examiner* — Benny T Lee
(74) *Attorney, Agent, or Firm* — Myers Bigel, P.A.

(57) ABSTRACT

An assembly for a radio frequency filter includes: an elongate pedestal with an upper surface; a resonator; a tuning member that is positioned above the resonator; and a screw that mounts the resonator to the upper surface of the pedestal, the screw including a shank with a thread and a head, the head including a plurality of recesses configured to receive a tool, the recesses extending through the head.

9 Claims, 8 Drawing Sheets

RADIO FREQUENCY FILTER COMPRISING A SCREW MOUNTED RESONATOR, WHERE THE SCREW INCLUDES RECESSES ON THE PERIMETER THEREOF

RELATED APPLICATION

The present application claims priority from and the benefit of Italian Patent Application No. 10202100001298, filed May 19, 2021, the disclosure of which is hereby incorporated herein by reference in full.

FIELD OF THE INVENTION

The present invention is directed generally to radio frequency ("RF") communications, and more specifically to filters for RF communications.

BACKGROUND OF THE INVENTION

Figure 1A:
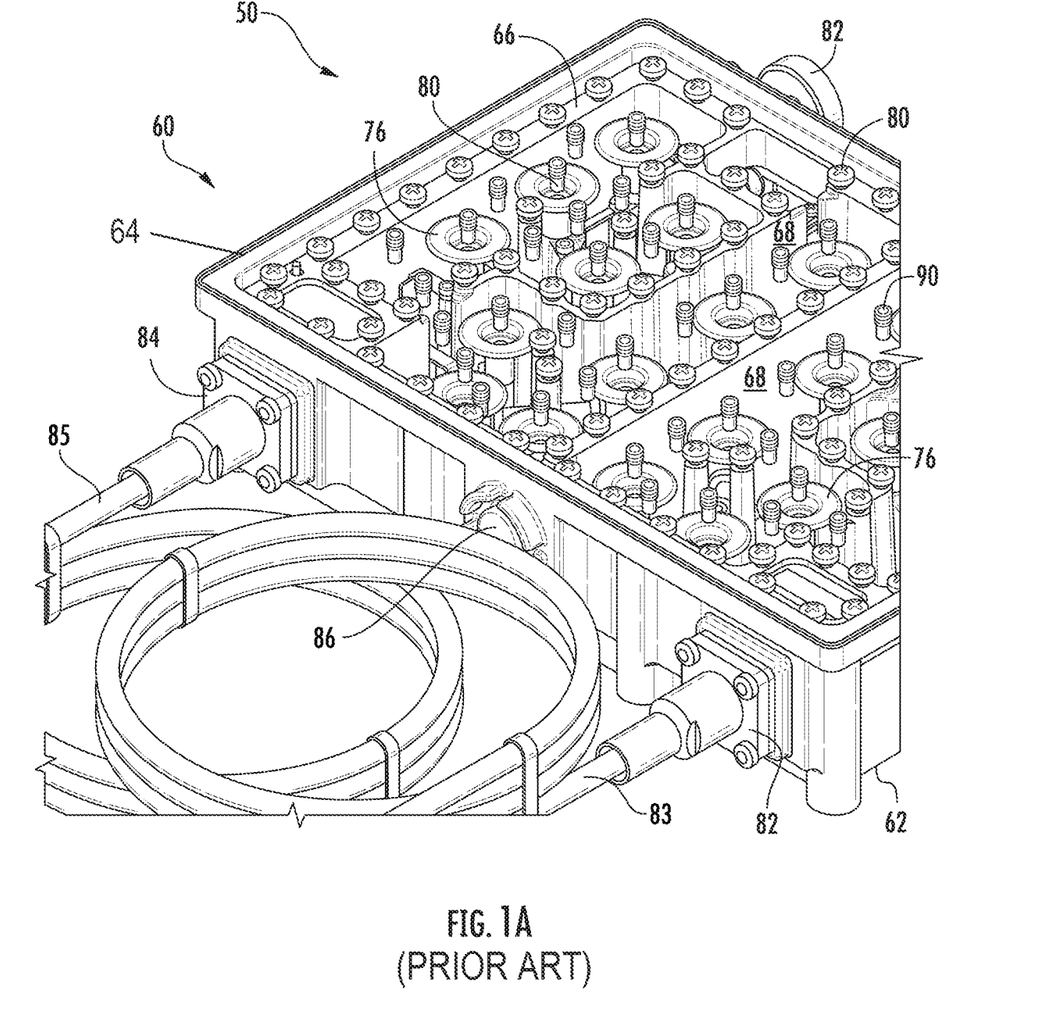
FIGS. 1A and 1B are perspective views of a conventional RF filter.
Figure 1B:
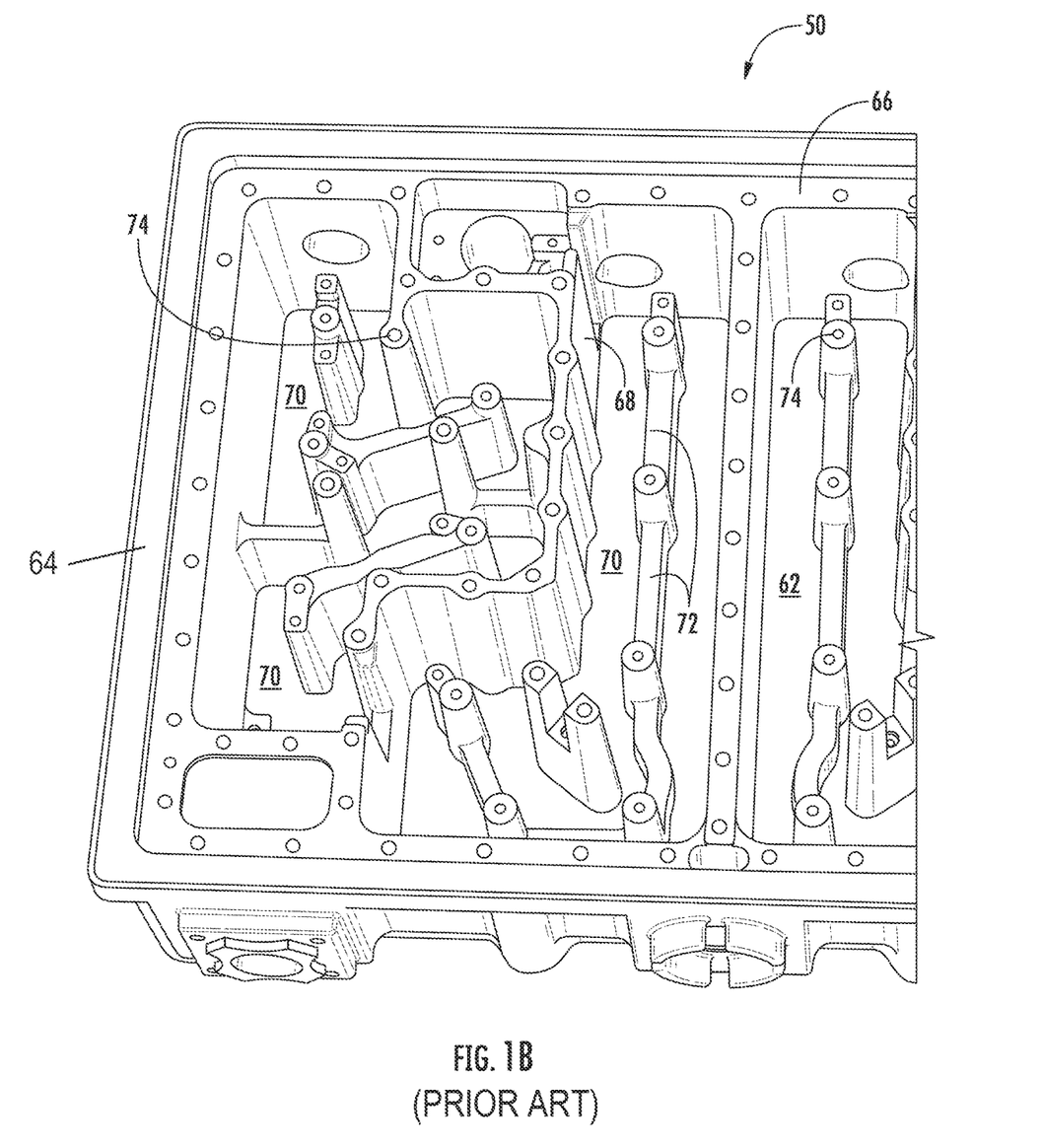

Antennas, such as base station antennas used in cellular communications systems, often include one or more RF filters. These filters are often implemented as resonant cavity filters. An example of a conventional resonant cavity filter 50 is shown in FIGS. 1A and 1B. The filter 50 is a dual duplexer that includes two three-port duplexers in a single housing (all six ports are not visible in FIGS. 1A and 1B). The filter 50 includes a housing 60 (FIG. 1A) that has a floor 62 and a plurality of sidewalls 64. An interior ledge 66 is formed around the periphery of the housing 60. A plurality of internal walls 68 extend upwardly from the floor 62 to divide the interior of the housing 60 into a plurality of resonant cavities 70 (FIG. 1B). Coupling windows 72 (FIG. 1B) are formed within the walls 68, and these windows 72, as well as openings between the walls 68, allow communication between the resonant cavities 70. A plurality of internally-threaded columns or "pedestals" 74 (FIG. 1B) extend upwardly from the floor 62. Respective resonating elements (or resonators) 76 (FIG. 1A) are mounted on the pedestals 74 to form resonator assemblies. The resonating elements 76 may comprise, for example, dielectric resonators or coaxial metal resonators, and may be mounted by screws 80 (FIG. 1A) on the respective pedestals 74. A cover plate (not shown) acts as a top cover for the filter 50. A large number of additional screws 80 are used to tightly hold the cover plate into place so that the cover plate continuously contacts the interior ledge 66 and the top surfaces of the walls 68 to provide good performance with respect to Passive Intermodulation ("PIM") distortion.

As shown in FIG. 1A, each duplexer of filter 50 may include a first frequency-selective port 82 for a first cable 83, a second frequency-selective port 84 for a second cable 85 and a common port 86. A plurality of tuning screws 90 are also provided. The tuning screws 90 may be adjusted to tune aspects of the frequency response of each duplexer such as, for example, the center frequency of the notches in the response of each duplexer. At least some of the tuning screws 90 may be positioned over respective ones of the resonators 76 so that the tuning screws 90 may be inserted different depths into the housing (and even into the open top ends of the resonators 76) in order to tune the resonant frequencies of the respective resonator assemblies.

Figure 2:
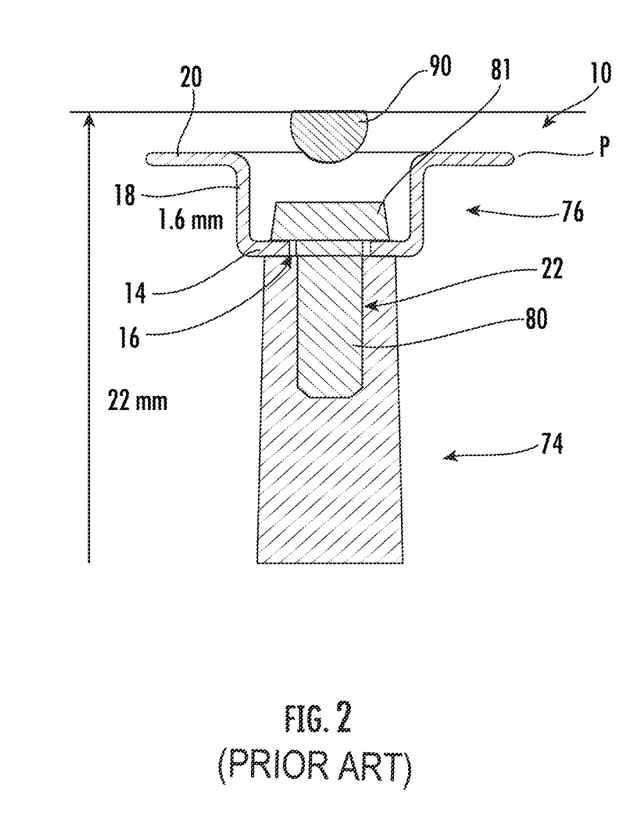
FIG. 2 is a schematic cross-section of a pedestal and resonator fastened with a conventional screw.

A typically configured resonator assembly 10 is shown in FIG. 2, with the metal resonator 76 being a metal (often steel) mounted on a pedestal 74. The resonator 76 is often bowl-shaped, with a floor 14 having a central hole 16, a cylindrical side wall 18, and an annular rim 20. The pedestal 74 (typically formed of metal) is essentially a tower upon with the resonator 76 is mounted. As discussed above, in ordinary circumstances, the resonator 76 is mounted to the upper surface of the pedestal 74 via a screw 80, which is inserted through the hole 16 in the resonator 76 and into a threaded bore 22 in the upper surface of the pedestal 74. A tuning screw 90 or other tuning member is shown suspended above the screw 80 and is positioned relative to the resonator 76 (e.g., about 22 mm above as base of the pedestal 74) to provide a desired frequency response (in some embodiments, the lower end of the tuning screw 90 intersects a plane P defined by the rim 20).

Resonators 76, pedestals 74 and tuning screws 90 are often rather small. Thus, small dimensional changes may have a significant impact on performance. As such, it may be desirable to provide alternative techniques and configurations for these components.

SUMMARY OF THE INVENTION

Some embodiments of the invention are directed to an assembly used in a filter for an antenna such as a base station antenna of a cellular communication system. The assembly comprises: an elongate pedestal with an upper surface; a resonator; a tuning member that is positioned above the resonator; and a screw that mounts the resonator to the upper surface of the pedestal, the screw including a shank with a thread and a head, the head including a plurality of recesses configured to receive a tool, the recesses extending through the head.

DETAILED DESCRIPTION OF THE INVENTION

The present invention is described with reference to the accompanying drawings. It will be appreciated that the present specification only describes a few example embodiments of the present invention and that the techniques described herein have applicability beyond the example embodiments described below.

Embodiments of the present invention have been described below with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout the detail description of the drawings.

It will be understood that, although the terms "first," "second," etc. may be used herein to describe various elements, these elements should not be limited by these terms. These terms are only used to distinguish one element from another. For example, a "first element" could be termed a second element, and, similarly, a "second element" could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed below can be combined in any way and/or combination with aspects or elements of other embodiments to provide a plurality of additional embodiments.

As cellular communications are supported in higher frequency bands, the size of various components included in cellular communications equipment is reduced, as the size of many components is a function of the wavelength of the RF signals transmitted and received by the cellular communications system. This may be true with respect to resonators that are included in resonant cavity filters. The inventors have recognized that one problem that may arise in resonant cavity filters that are designed to operate in higher frequency bands such as the 3 GHz and 5 GHz frequency bands is that the tuning elements 90 that are designed to capacitively couple with the resonators 76 may tend to couple heavily with the metal fasteners that are used to mount the resonators 76 on the respective pedestals 74 as shown with respect to FIGS. 1A and 1B. The increased coupling between each tuning element 90 and its associated fastener results in decreased coupling between the tuning element and the associated resonator 76, which may reduce the range by which the tuning screws 90 may be used to adjust the resonant frequency of each resonator 76. While using dielectric as opposed to metal fasteners to mount the resonators 76 onto the respective pedestals 74 may avoid this unintended coupling issue, dielectric fasteners may not provide as secure a connection between the resonators 76 and the pedestals 74, which may result in increased PIM distortion and/or increase the risk that a connection between a resonator 76 and the associated pedestal 74 fails.

Figure 3:
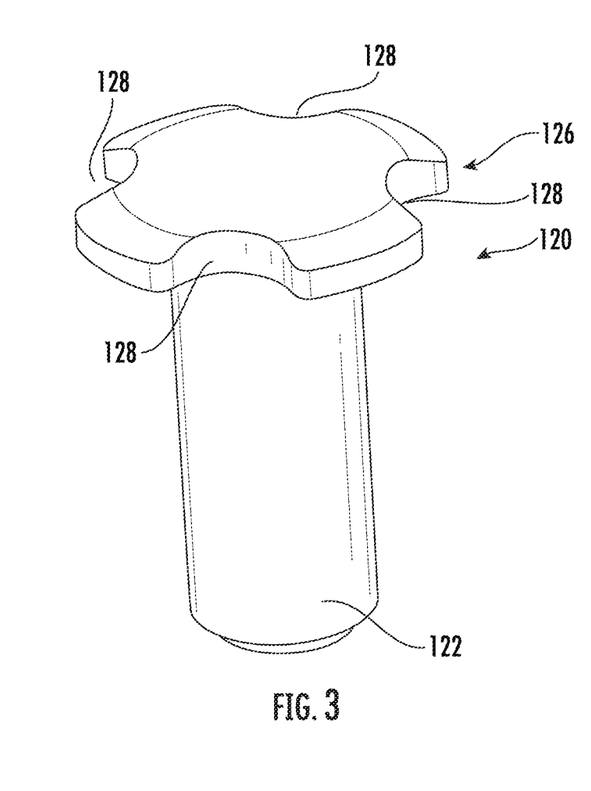
FIG. 3 is a perspective view of a screw used to fasten a resonator to a pedestal according to embodiments of the invention.
Figure 5:
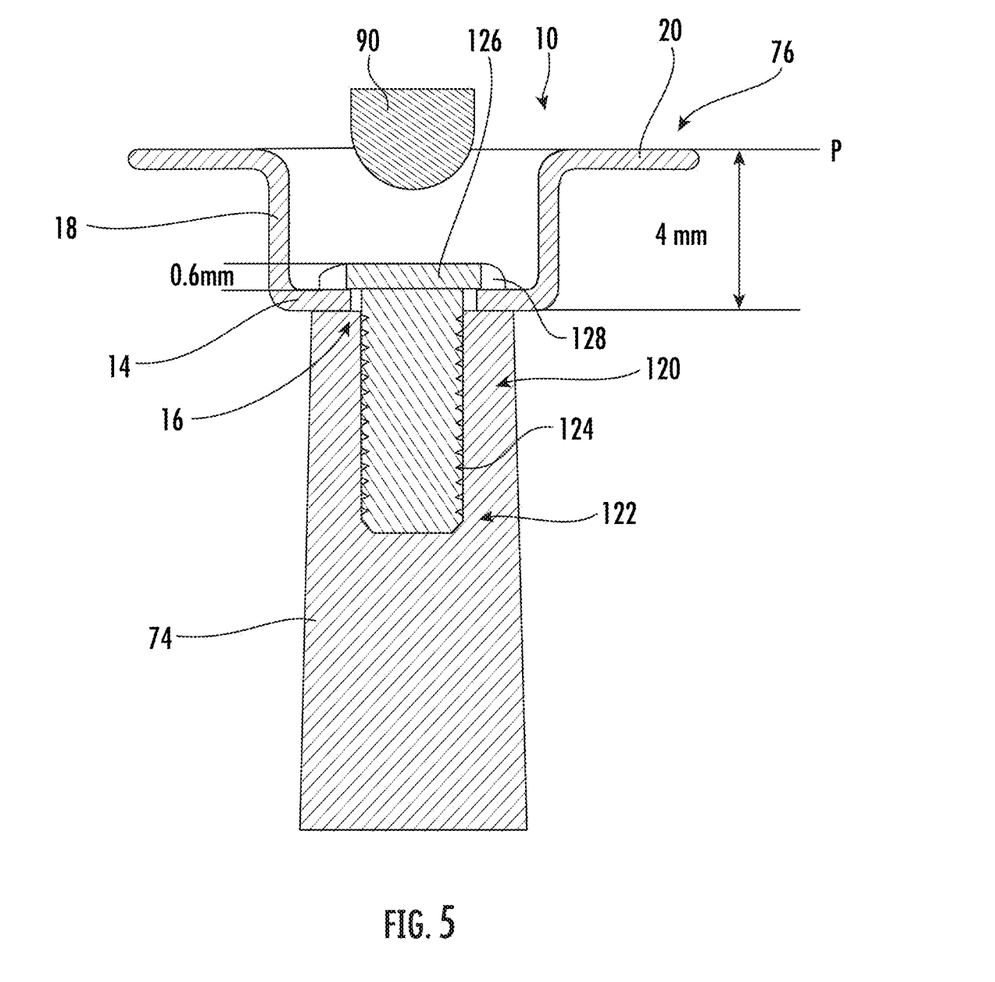
FIG. 5 is a schematic section view of the screw of FIG. 3 employed to mount a resonator on a pedestal.

Referring now to FIGS. 3 and 5, a low-headed screw, designated broadly at 120, is shown therein. The screw 120 has a shank 122 with a helical thread 124 (shown schematically in FIG. 5) and a head 126. As can be seen in FIG. 3, the head 126 is relatively short, and has four recesses 128 spaced equidistantly about its perimeter.

Figure 4A:
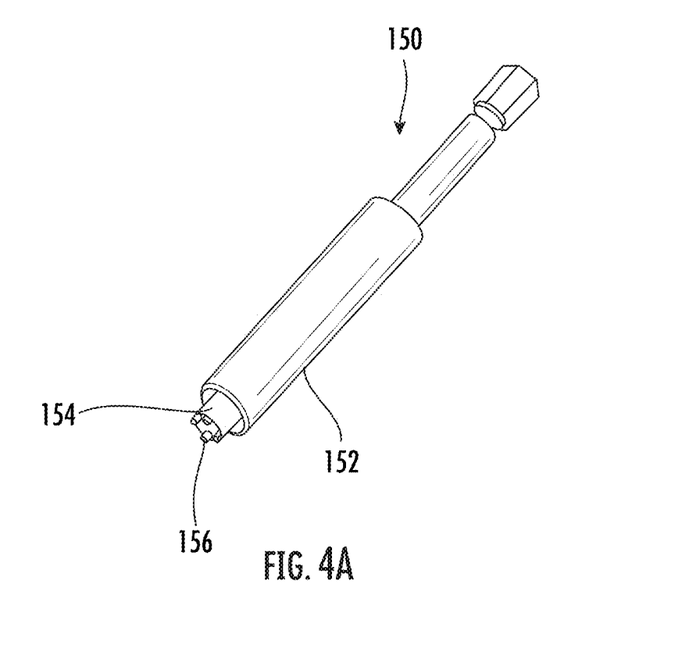
FIG. 4A is a perspective view of a tool for fastening the screw of FIG. 3.
Figure 4B:
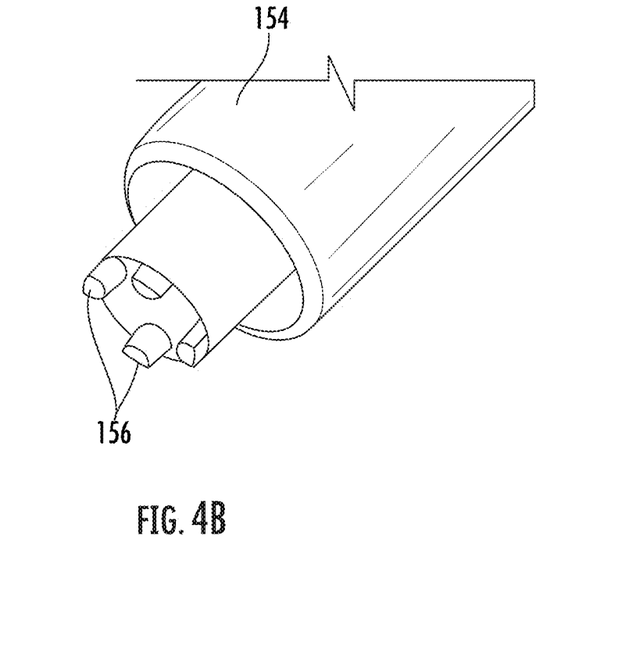
FIG. 4B is an enlarged partial perspective view of the head and teeth of the tool of FIG. 4A.

FIGS. 4A and 4B illustrate a tool 150 (FIG. 4A) that can be used to insert and tighten the screw 120 as shown in FIG. 2. The tool 150 includes an elongate handle 152 and a head 154, as best shown in FIG. 4A, that has four axially-extending teeth 156, as best shown in FIG. 4B. The teeth 156 are spaced to fit in the recesses 128 of the screw 120 (e.g., FIG. 3). This configuration enables the tool 150 to engage the screw 120 with the teeth 156, such that rotation of the tool 150 about its longitudinal axis rotates the screw 120 into place to secure a resonator 76 to a pedestal 74 (see FIG. 5).

In the illustrated embodiment, the head 126 is between about 0.4 and 0.8 mm in thickness, with 0.6 mm being typical (see FIG. 5). This compares to a conventional screw 80 of similar gauge, which typically has a head 81 that is about 1.5 to 2 mm in thickness, such as 1.6 mm (see FIG. 2). A head of this thickness is typically necessary on a conventional screw 80 because such a head will include either a single slot (to receive a flathead screwdriver) or a cruciform-shaped series of continuous slots (to receive a Phillips head screwdriver). Thus, the screw 120 occupies considerably less space within the resonator 76 (which is typically between about 3 and 5 mm in height) and is positioned farther from the lower end of the tuning screw 90. In some embodiments, the thickness of the head 126, such as 0.6 mm, is between about 10 to 25 percent of the height of the resonator 76, such as 4 mm Thus, as shown in FIG. 5, the screws 120 according to embodiments of the present invention may be positioned at a greater distance from the associated tuning elements, and hence will capacitively couple less with the tuning elements.

The inventors have discovered that employment of a low-headed screw 120 to mount a resonator 76 on a pedestal 74 (FIG. 5) can provide a number of advantages. Without intending to be bound by a single theory of operation, as discussed above, it is believed that the screws 80 (FIG. 2), 120 (FIG. 5) participate in, and therefore can impact, the capacitive coupling relationship between the resonator 76 and the tuning screw 90, as shown in FIG. 5. The greater distance between the low-headed screw 120 and the corresponding tuning screw 90 (as compared to the distance between a conventional screw 80 and a tuning screw 90, as shown in FIG. 2) can reduce the impact that the screw 120 has on this capacitive coupling relationship, and thus can provide performance advantages, as discussed below.

Figure 6A:
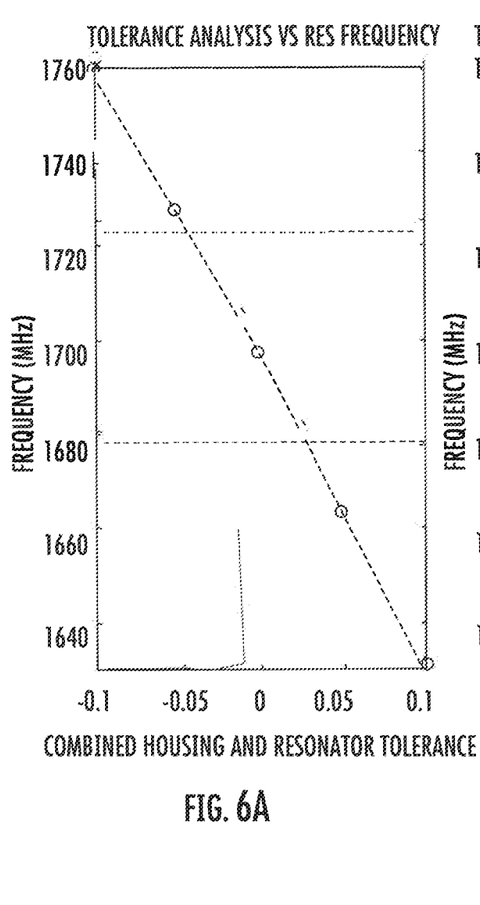
FIG. 6A is a graph showing tolerance analysis versus resonance frequency plotting resonance frequency (in MHz) as a function of housing (pedestal) and resonator height (in mm).
Figure 6B:
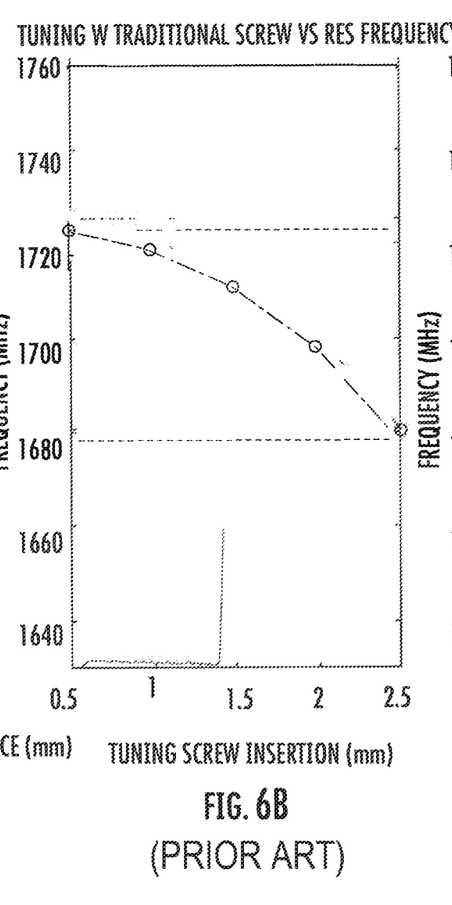
FIG. 6B is a graph showing tuning with traditional screw versus resonance frequency plotting resonance frequency (in MHz) as a function of tuning screw position or insertion (in mm) when a conventional screw is employed to mount the resonator to the pedestal.
Figure 6C:
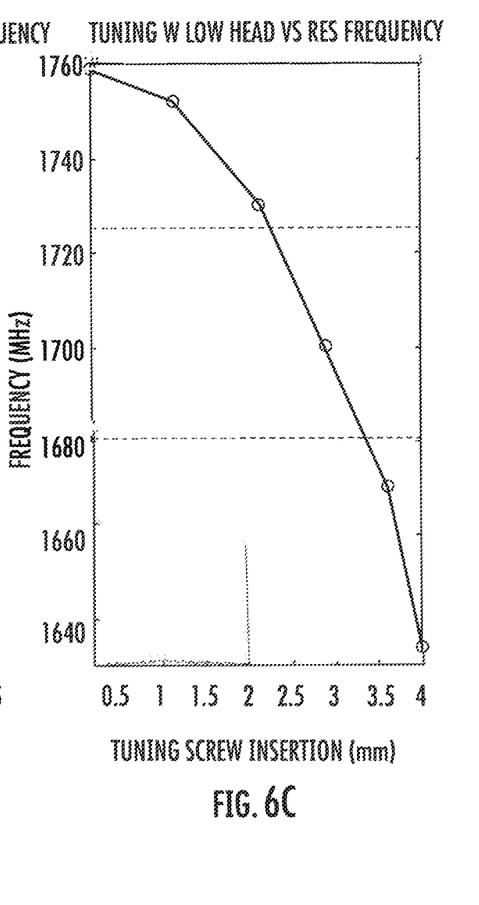
FIG. 6C is a similar graph plotting resonance frequency (in MHz) as a function of tuning screw position or insertion (in mm), but employing a low-headed screw of FIG. 3.

First, as shown in FIGS. 6A-6C, the use of a low-headed screw 120 can enable the user to employ pedestals 74 and resonators 76, as shown in FIG. 5 that are produced in manufacturing processes that have wider tolerances. FIG. 6A shows how the resonance frequency in MHz is impacted by varying heights of the pedestal 74 (termed in FIG. 6A as the "housing") and the resonator 76. When a conventional screw 80 is employed to attach the resonator 76 to the pedestal 74 (FIG. 6B), the range of resonance frequencies is reduced considerably for a given tuning screw insertion distance, which indicates that particularly tight tolerances are required in order to allow the tuning screw to vary the resonant frequency over a suitably wide range. In contrast, FIG. 6C shows a much wider frequency range under the same conditions. As a result, the pedestal 74 and resonator 76 can be produced under more forgiving manufacturing conditions (i.e., looser tolerances), which leads to less expensive production and less scrap (from non-conforming components).

Figure 7A:
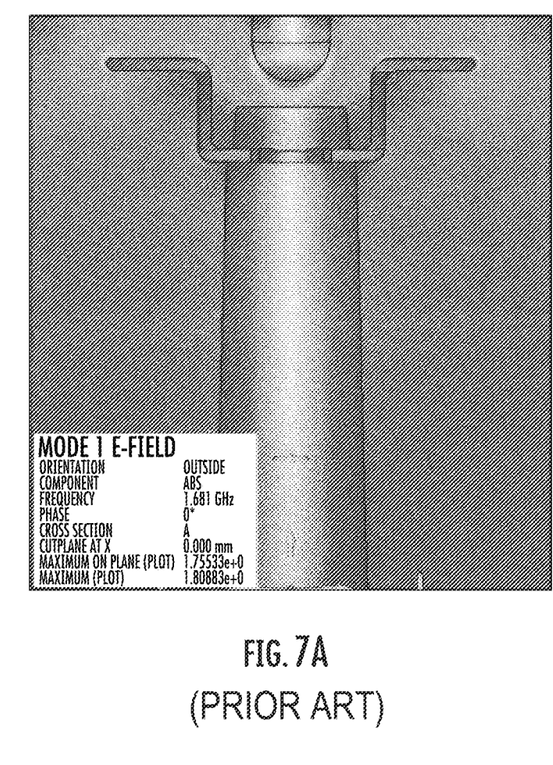
FIGS. 7A and 7B are plots showing the electric field produced by an assembly comprising a tuning screw and a pedestal and resonator fastened with a conventional screw (FIG. 7A) versus the screw of FIG. 3 (FIG. 7B).
Figure 7B:
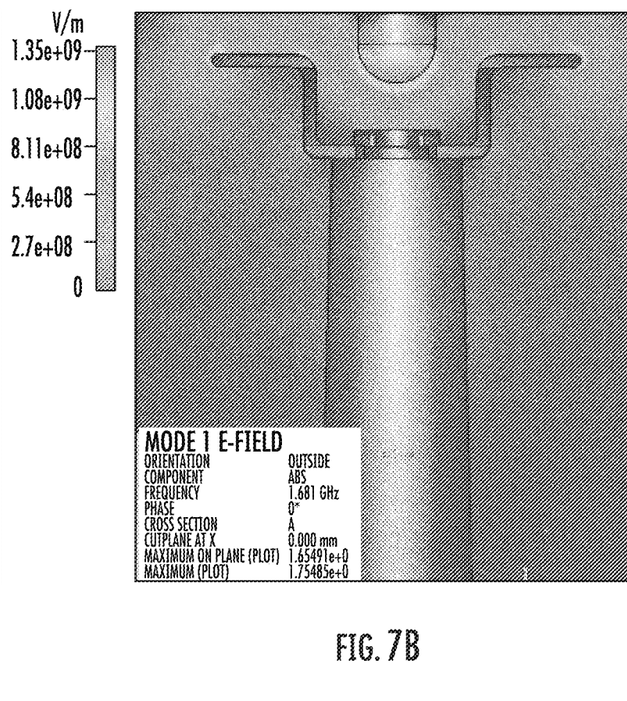

Second, the low-headed screw 120 can provide a better environment for electrical performance. FIGS. 7A and 7B illustrate electric field simulations of the first mode conducted on resonators 76 that are secured with a low-headed screw 120 (FIG. 7B) and a conventional screw 80 (FIG. 7A) of similar size. In the simulations, a tuning screw 90 is located in the same position relative to the resonator 76, which means that the tuning screw 90 is nearer the upper surface of the conventional screw 80 than to the upper surface of the low-headed screw 120. FIGS. 7A and 7B show that a higher maximum electric field is produced in the space above the conventional screw 80 than in the space above the low-headed screw 120.

Figure 8A:
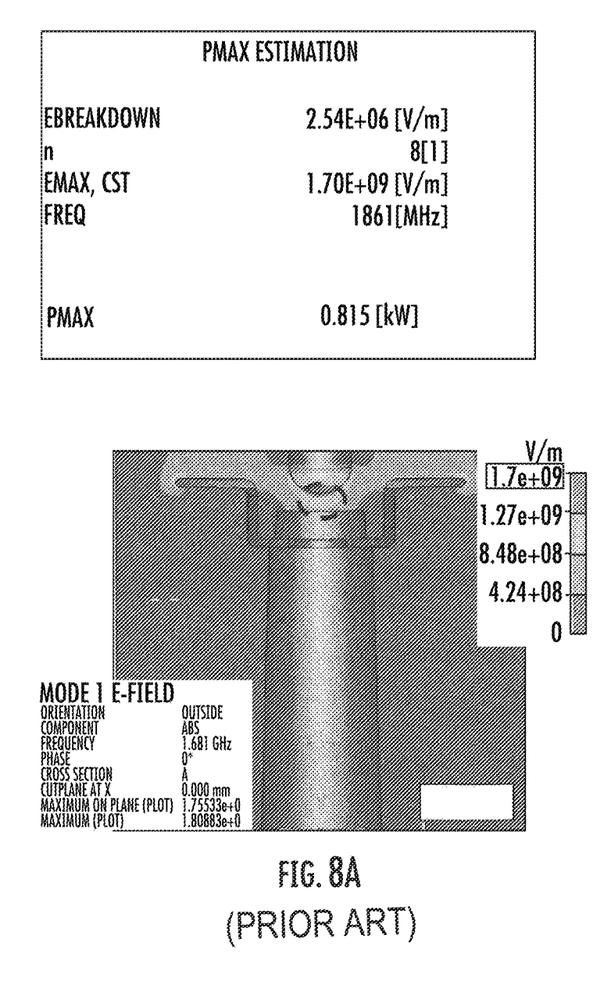
FIGS. 8A and 8B are plots showing the distribution of the electric field of an assembly with a tuning screw and a pedestal and resonator fastened with a conventional screw (FIG. 8A) versus a screw of FIG. 3 (FIG. 8B).
Figure 8B:
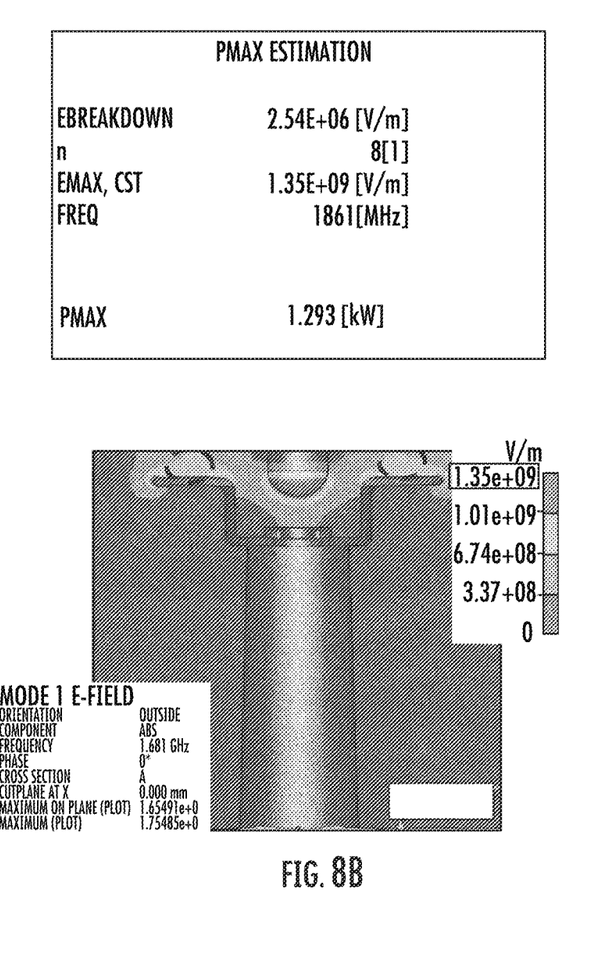

Because the arrangement that employs the low-headed screw 120 has a lower first mode maximum electric field, a resonator 76 employing the low-headed screw 120 (FIG. 8B) can receive a higher power level without suffering electrical breakdown than the conventional screw 80 (FIG. 8A). FIGS. 8A and 8B show that, while the maximum electric field of the conventional screw arrangement is directly above the screw 80, the maximum electric field of the arrangement utilizing the low-headed screw 120 is located on the rim 20 of the resonator 76, and has a lower amplitude. Using Equation 1 below, $$P_{Breakdown} = \left( \frac{E_{max}^{(Breakdown)}}{n_{max}^{norm} E_{max,CST}} \right)^2 2\omega_o \quad \text{(Equation 1)}$$

wherein
$P_{Breakdown}$ is the maximum peak power at breakdown;
$E_{max}^{(Breakdown)}$ is the maximum electric field at breakdown;
$n_{max}^{(norm)}$ is an overvoltage factor set at 8;
$E_{max,CST}$ is the first mode electric field (simulated in FIG. 7);
and
$\omega_0$ is the frequency;
it can be calculated that the maximum power $P_{Breakdown}$ that can be applied to the arrangement without causing an electrical breakdown is approximately 40 percent higher when the low-headed screw 120 is used. Thus, the use of the low-headed screw 120 can provide significantly improved electrical properties to arrangement of the resonator 76 and tuning screw 90.

Those of skill in this art will appreciate that the low-headed screw 120 (e.g., FIG. 3) and/or the tool 150 (FIG. 4A) may take other forms. For example, the head 126 may have more or fewer recesses 128 (e.g., FIG. 3), with the tool 150 having a corresponding number of teeth 156 (FIGS. 4A and 4B). In other embodiments, the recesses may not extend fully through the head 126 (i.e., between the top and bottom surfaces of the head 126), but instead may extend only partially from the upper surface into the thickness of the head 126. In other embodiments, the recesses 128 may be located radially inwardly from the perimeter of the head 126, rather than extending inwardly from the perimeter. Other variations may also be employed.

Exemplary embodiments according to the present disclosure have been described in detail above with reference to the accompanying drawings. However, those skilled in the art should appreciate that a plurality of changes and modifications may be made to the exemplary embodiments of the present disclosure without departing from the spirit and scope of the present disclosure. All the changes and modifications are encompassed within the protection scope of the present disclosure as defined by the claims. The present disclosure is defined by the appended claims, and the equivalents of these claims are also contained therein.

That which is claimed is:

1. An assembly for a radio frequency filter, comprising:
   an elongate pedestal with an upper surface;
   a resonator;
   a tuning member that is positioned above the resonator; and
   a screw that mounts the resonator to the upper surface of the pedestal, the screw including a shank with a thread and a head, the head including a plurality of recesses configured to receive a tool, the plurality of recesses located on a perimeter of the head and extending through the head.

2. The assembly defined in claim 1, wherein the head includes at least three spaced-apart recesses.

3. The assembly defined in claim 1, wherein the head is between about 0.4 and 0.8 mm in thickness.

4. The assembly defined in claim 1, wherein the resonator comprises steel.

5. The assembly defined in claim 1, wherein the resonator comprises a floor, a cylindrical side wall that extends from the floor, and an annular rim that extends radially outwardly from the side wall, and wherein the screw extends through a hole in the floor of the resonator.

6. The assembly defined in claim 5, wherein the tuning member is positioned to intersect a plane defined by the rim.

7. The assembly defined in claim 1, wherein the resonator is between about 3 and 5 mm in height.

8. The assembly defined in claim 1, wherein the plurality of recesses are spaced equidistantly apart from each other.

9. The assembly defined in claim 1, wherein a thickness of the head is between about 10 to 25 percent of a height of the resonator.

* * * * *